(12) United States Patent
Tange et al.

(10) Patent No.: US 8,696,207 B2
(45) Date of Patent: Apr. 15, 2014

(54) SLIDING BEARING

(75) Inventors: Kenji Tange, Tochigi (JP); Hiroyuki Kikuchi, Tochigi (JP); Eiichi Yamashita, Kanagawa (JP); Masaya Kinjyo, Kanagawa (JP)

(73) Assignee: Oiles Corporation, Tokyo (JP)

(*) Notice: Subject to any disclaimer, the term of this patent is extended or adjusted under 35 U.S.C. 154(b) by 78 days.

(21) Appl. No.: 13/497,146

(22) PCT Filed: Jul. 26, 2011

(86) PCT No.: PCT/JP2011/004223
§ 371 (c)(1),
(2), (4) Date: Mar. 20, 2012

(87) PCT Pub. No.: WO2012/032708
PCT Pub. Date: Mar. 15, 2012

(65) Prior Publication Data
US 2012/0237146 A1 Sep. 20, 2012

(30) Foreign Application Priority Data
Sep. 8, 2010 (JP) ................... 2010-201478

(51) Int. Cl.
*F16C 27/00* (2006.01)
(52) U.S. Cl.
USPC ........................................ 384/215
(58) Field of Classification Search
USPC ........... 384/13, 26, 29, 32, 42, 215, 220, 275, 384/276; 74/388 PS; 280/93.514
See application file for complete search history.

(56) References Cited

U.S. PATENT DOCUMENTS

| | | | |
|---|---|---|---|
| 3,985,061 A * | 10/1976 | Montgomery | 384/13 |
| 4,218,933 A * | 8/1980 | Allen et al. | 74/422 |
| 7,220,056 B2 * | 5/2007 | Kubota et al. | 384/215 |
| 2009/0000853 A1 * | 1/2009 | Hirose et al. | 384/42 |
| 2010/0003059 A1 | 1/2010 | Kitamura | |

FOREIGN PATENT DOCUMENTS

| | | |
|---|---|---|
| JP | 2008-151289 | 7/2008 |
| JP | 2010-014151 | 1/2010 |

OTHER PUBLICATIONS

International Search Report for PCT/JP2011/004223, mailed Oct. 18, 2011.

* cited by examiner

Primary Examiner — Thomas R Hannon
(74) Attorney, Agent, or Firm — Nixon & Vanderhye, P.C.

(57) ABSTRACT

A sliding bearing 1 includes a cylindrical bearing body 11; slits 14 to 18 provided in the bearing body 11; straight grooves 35 to 39 provided on an inner side of the bearing body 11 in such a manner as to extend in an axial direction A and respectively disposed between adjacent ones of the slits 14 to 18 which are adjacent in a direction B about an axis; a sliding surface 19 which is provided on the inner side of the bearing body 11 and partially severed in the direction B about the axis by the slits 14 to 18 and the straight grooves 35 to 39; a fitting groove 21 provided in an outer surface 20 of the bearing body 11; and an elastic ring 22 which is fitted in the fitting groove 21. Each of the straight grooves 35 to 39 is closed on an end face 12 side and is open on an end face 13 side.

3 Claims, 5 Drawing Sheets 76 78 35 19 75 77 76

SLIDING BEARING

This application is the U.S. national phase of International Application No. PCT/JP2011/004223, filed 26 Jul. 2011, which designated the U.S. and claims priority to JP Application No. 2010-201478, filed 8 Sep. 2010, the entire contents of each of which are hereby incorporated by reference.

TECHNICAL FIELD

The present invention relates to a bearing mechanism having a sliding bearing which is interposed between, for example, a shaft, such as a rack shaft, and a housing of an automobile.

BACKGROUND ART

In Patent Document 1, for example, a sliding bearing is proposed which includes: a synthetic resin-made cylindrical bearing body; a plurality of first slits provided in the bearing body and extending from one axial end face of the bearing body toward the other axial end face of the bearing body; second slits provided in the bearing body and extending from the other axial end face of the bearing body toward the one axial end face of the bearing body; a sliding surface which is provided on an inner side of the bearing body and partially severed in a direction about an axis by these slits; at least one fitting groove provided in an outer surface of the bearing body; and an elastic ring which is fitted in the fitting groove in such a manner as to partially project radially from the outer surface of the bearing body and to reduce the diameter of the bearing body.

PRIOR ART DOCUMENTS

Patent Documents

Patent Document 1: JP-A-2008-151289

SUMMARY OF THE INVENTION

Problems that the Invention is to Solve

The sliding bearing has advantages in that, as compared with a rolling bearing, the sliding bearing is low in cost and excels in the vibration absorbing characteristic. Nevertheless, there is a problem in that since an appropriate clearance (bearing clearance) is required between the sliding bearing and the rack shaft, collision noise occurs between the rack shaft and the sliding bearing due to the vibration occurred to the rack shaft, and is transmitted to the driver of the automobile as unpleasant sound. If the clearance between the sliding bearing and the rack shaft is made small to suppress the occurrence of this collision noise, the frictional torque increases, and the difference in frictional torque between at the time of a linear motion start and during linear motion becomes large. At the same time, the small clearance constitutes a factor hampering the stability in frictional torque, such as the occurrence of variations in frictional torque during linear motion due to a stick-slip phenomenon or the like caused by dimensional errors in the outside diameter of the rack shaft.

In addition, although the rack shaft is linearly movably supported by a housing by means of the sliding bearing, the roundness of the inside diameter of the housing is normally not very high. If the sliding bearing made of a synthetic resin is press fitted and fixed into such a housing, the sliding bearing is strained by being affected by the roundness of the inside diameter of the housing, producing a difference in the clearance with the rack shaft. This also hampers the stability of the frictional torque.

In the sliding bearing of Patent Document 1, the elastic ring is fitted to the cylindrical bearing body in which the plurality of slits and the fitting groove are provided, as described above. Therefore, this sliding bearing makes it possible to eliminate the noise of collision with the rack shaft, decrease the linear-motion frictional resistance, make small the difference in the linear-motion frictional resistance between at the time of a linear motion start and during linear motion, and obtain stable linear-motion frictional resistance without being affected by such as dimensional errors in the outside diameter of the rack shaft and the roundness of the inside diameter of the housing, thereby making it possible to support the rack shaft smoothly and effect the linear motion of the rack shaft more smoothly. However, there are cases where various dimensional errors in the outside diameter have occurred to the rack shaft, and therefore in any circumstances it is difficult to reliably suppress the generation of unpleasant noise attributable to the stick-slip phenomenon or the like due to the dimensional errors in the outside diameter.

The present invention has been devised in view of the above-described aspects, and its object is to provide a sliding bearing which makes it possible to more reliably suppress the generation of unpleasant noise attributable to the stick-slip phenomenon or the like.

Means for Overcoming the Problems

A sliding bearing in accordance with the present invention comprises: a cylindrical bearing body; a first slit provided in the bearing body and extending from one axial end face of the bearing body toward another axial end face of the bearing body; a second slit provided in the bearing body and extending from the other end face of the bearing body toward the one end face of the bearing body; at least one straight groove provided on an inner side of the bearing body in such a manner as to extend in an axial direction and disposed between the slits in a direction about an axis; a sliding surface which is provided on the inner side of the bearing body and partially severed in the direction about the axis by the slits and the straight groove; at least one fitting groove provided in an outer surface of the bearing body; and an elastic ring which is fitted in the fitting groove in such a manner as to partially project radially from the outer surface of the bearing body and to reduce the diameter of the bearing body, wherein the at least one straight groove is closed on a side of the one axial end face of the bearing body, and is open on a side of the other axial end face of the bearing body.

According to the sliding bearing in accordance with the present invention, the sliding bearing has at least one straight groove provided on the inner side of the bearing body in such a manner as to extend in the axial direction and disposed between the slits in the direction about the axis. This straight groove is closed on the one axial end face side of the bearing body, and is open on the other axial end face side of the bearing body. Therefore, it is possible to further reliably prevent the generation of unpleasant noise attributable to the stick-slip phenomenon or the like.

In the sliding bearing in accordance with the present invention, the bearing body may have a tapered surface which extends in the axial direction from the other end face toward the one end face of the bearing body while undergoing a gradual reduction in diameter, terminates at an annular end of the sliding surface, and is severed in the direction about the axis by the second slit, and one end of the straight groove which is located on the side of the one axial end face of the bearing body may be closed by the sliding surface of the bearing body, while another end of the straight groove which is located on the side of the other axial end face of the bearing body may be located on the tapered surface which is located on a side closer to the other end face of the bearing body than the sliding surface.

In the sliding bearing in accordance with the present invention, the straight groove may be defined by a bottom surface located on a side closer to the outer surface of the bearing body than the sliding surface and extending in the axial direction and a pair of side walls connected to the sliding surface and both edges in the direction about the axis of the bottom surface and extending in the axial direction. Such a pair of side walls may be formed in such a manner as to gradually approach each other from the other end face toward the one end face of the bearing body.

In the sliding bearing in accordance with the present invention, the sliding bearing may comprise at least two straight grooves, wherein a plurality of slits may be provided as the first slit, at least one of the plurality of first slits being provided in one semicylindrical portion of the bearing body which is severed by an imaginary diametrical line passing through a center of the bearing body, a remaining one/ones of the plurality of first slits being provided in another semicylindrical portion of the bearing body which is severed by the imaginary diametrical line passing through the center of the bearing body, wherein the at least one first slit provided in the one semicylindrical portion may extend in a direction perpendicular to the imaginary diametrical line, such that a width thereof in a direction parallel to the imaginary diametrical line becomes identical from an inner side to an outer side of the one semicylindrical portion of the bearing body, or such that the width becomes gradually larger from the inner side toward the outer side of the one semicylindrical portion of the bearing body, and the remaining one/ones of the first slits provided in the other semicylindrical portion may extend in the direction perpendicular to the imaginary diametrical line, such that the width thereof in the direction parallel to the imaginary diametrical line becomes identical from the inner side to the outer side of the other semicylindrical portion of the bearing body, or such that the width becomes gradually larger from the inner side toward the outer side of the other semicylindrical portion of the bearing body, and wherein one of the at least two straight grooves may be provided in the one semicylindrical portion by being located between at least one of the plurality of first slits and the second slit, and a remaining one of the at least two straight grooves may be provided in the other semicylindrical portion by being located between a remaining one/ones of the plurality of first slits and the second slit. According to such a sliding bearing, even if the bearing body together with the both slits is molded by a two-split die body including an outer die for the one semicylindrical portion and an outer die for the other semicylindrical portion, the two-split die body can be easily removed from the bearing body by being respectively drawn out in outer directions after molding. Thus, it is possible to mold the outer surface side without using a die body which is split into a number corresponding to the number of the slits to be formed by the die body. Hence, it is possible to easily manufacture the sliding bearing having the plurality of slits and the fitting grooves, thereby making it possible to attain a cost reduction.

In the sliding bearing in accordance with the present invention, at least one first slit provided in the one semicylindrical portion may be defined by a pair of flat walls of the one semicylindrical portion extending flatly and in parallel to each other in the direction from the inner side toward the outer side of the one semicylindrical portion. Alternatively, at least one first slit provided in the one semicylindrical portion may be defined by one flat wall of the one semicylindrical portion extending flatly in the direction from the inner side toward the outer side of the one semicylindrical portion and by another flat wall of the one semicylindrical portion extending flatly and gradually away from the flat wall in the direction from the inner side toward the outer side of the one semicylindrical portion. Still alternatively, at least one first slit provided in the one semicylindrical portion may be defined by a pair of flat walls of the one semicylindrical portion extending flatly and gradually away from each other in the direction from the inner side toward the outer side of the one semicylindrical portion.

The remaining one/ones of the first slits provided in the other semicylindrical portion may be defined by a pair of flat walls of the other semicylindrical portion extending flatly and in parallel to each other in the direction from the inner side toward the outer side of the other semicylindrical portion. Alternatively, the remaining one/ones of the first slits provided in the other semicylindrical portion may be defined by one flat wall of the other semicylindrical portion extending flatly in the direction from the inner side toward the outer side of the other semicylindrical portion and by another flat wall of the other semicylindrical portion extending flatly and gradually away from the flat wall in the direction from the inner side toward the outer side of the other semicylindrical portion. Still alternatively, the remaining one/ones of the first slits provided in the other semicylindrical portion may be defined by a pair of flat walls of the other semicylindrical portion extending flatly and gradually away from each other in the direction from the inner side toward the outer side of the other semicylindrical portion.

In the sliding bearing in accordance with the present invention, when the bearing body with the elastic ring fitted thereon is inserted onto the inner peripheral surface of the housing, the elastic ring projecting partially from the outer peripheral surface of the bearing body undergoes elastic deformation with an interference with respect to the inner peripheral surface of the housing. This elastic deformation makes it possible to absorb dimensional errors of the housing in such as the roundness of its inside diameter. In addition, the bearing body in accordance with the present invention, whose diameter is capable of being freely reduced by the slits each having an open end at each end face of the bearing body, is made to undergo reduction in diameter by the elastic ring and tightens through the sliding surface the rack shaft inserted therein. Therefore, the clearance with the rack shaft can be set to zero, thereby making it possible to eliminate the collision with the rack shaft. As a result, it is possible to prevent the occurrence of the collision noise which is transmitted as unpleasant sound. In addition, it is possible to make small the difference in the linear-motion frictional resistance between at the time of a linear motion start and during linear motion, and obtain stable linear-motion frictional resistance by absorbing dimensional errors in the outside diameter of the rack shaft.

In a preferred example, the sliding bearing is fitted in the housing through which the rack shaft or the like is passed through. As the elastic ring fitted in the fitting groove, it is possible to cite as a preferred example an elastic ring whose outside diameter is approximately 0.3 mm to 1.0 mm greater than the diameter of the inner peripheral surface of the housing and whose inside diameter is approximately 0.3 mm to 1.0 mm smaller than the diameter of the bottom surface of the fitting groove, although the size of the elastic ring depends on its modulus of elasticity. In brief, it suffices if the elastic ring has an interference with the inner peripheral surface of the housing, projects from the outer peripheral surface of the bearing body, and is adapted to reduce the diameter of the bearing body to such an extent as to set the clearance between the sliding surface and the shaft such as the rack shaft to zero by tightening the shaft such as the rack shaft with appropriate resiliency through the sliding surface. Specifically, it suffices at least if the outside diameter of the elastic ring is greater than the diameter of the inner peripheral surface of the housing, and the inside diameter of the elastic ring is smaller than the diameter of the bottom surface of the groove.

Each of the elastic rings may be a so-called O-ring having a circular cross section, but may be a ring of other shapes, such as an X-shaped cross section, a U-shaped cross section, and a trapezoidal cross section. The elastic material for forming the elastic ring may be any one of natural rubber, synthetic rubber, and an elastic thermoplastic synthetic resin, e.g., a polyester elastomer.

In the present invention, each of the first and the second slits may be provided in plural numbers in the bearing body, and the first and the second slits may be arranged alternately in the direction about the axis. Each sliding surface may preferably be provided on the inner side of the bearing body between positions each axially spaced apart a predetermined distance from each of the end faces of the bearing body. In addition, in a preferred example, at least two fitting grooves axially spaced apart from each other are provided in the outer peripheral surface of the bearing body, elastic rings are respectively fitted in the fitting grooves in such a manner as to partially project from the outer peripheral surface of the bearing body and to reduce the diameter of the bearing body, and an axially central portion of the sliding surface is located between the two fitting grooves in the axial direction. The sliding surface may be provided on the inner side of the bearing body between the two fitting grooves in the axial direction, or may be provided on the inner side of the bearing body by extending beyond the two fitting grooves in the axial direction.

The elastic ring which is fitted in the fitting groove need not be disposed in the fitting groove in close contact with the bearing body without a gap, and may be fitted in the fitting groove with a slight gap with respect to the bearing body. The elastic ring may be adapted to be deformed and fill the fitting groove completely in a case where the portion of the elastic ring projecting partially radially from the outer peripheral surface of the bearing body is properly pressed by the housing. Alternatively, an arrangement may be provided such that even in a case where the elastic ring is thus pressed properly by the housing, the elastic ring has a slight gap with respect to the bearing body, whereas in a case where the housing has been off-centered from a proper position with respect to the rack shaft due to an unintentional external force, and has been locally pressed strongly by the housing, the elastic ring is deformed at the excessively pressed portion and fills the fitting groove completely to increase the rigidity, thereby counteracting the unintentional off-center of the housing.

The sliding bearing is preferably arranged such that a clearance having a width of 0.3% to 10% of a radial maximum thickness of the bearing body at its portion constituting a free end portion of the bearing body with respect to the housing is preferably produced between the inner peripheral surface of the housing and the outer peripheral surface of the bearing body at the portion constituting the free end portion thereof. If the clearance is less than 0.3%, there is a possibility that the housing easily comes into contact with the bearing body to produce abnormal noise and the like in a case where the housing has been off-centered from a proper position with respect to the rack shaft due to an unintentional external force.

If the clearance is greater than 10%, there is a possibility that the housing is easily off-centered greatly from a proper position with respect to the rack shaft due to an unintentional external force, causing a decline in the aligning effect based on the sliding bearing. Accordingly, if the sliding bearing is constructed as described above, it is possible to avoid the contact of the housing with the bearing body, and the housing can be reliably held at a proper position with respect to the rack shaft.

In the sliding bearing in accordance with the present invention, in order to ensure a large entry and exit of air outside the housing with respect to the housing interior in the axial movement of the rack shaft, a ventilating groove for allowing the housing interior and the housing exterior to communicate with each other may be provided on the outer surface side or the inner surface side of the bearing body.

In a preferred example, the inner side of the bearing body may have one tapered surface extending and gradually reduced in diameter from the one end face of the bearing body to one axial end of the sliding surface and another tapered surface extending and gradually reduced in diameter from the other end face of the bearing body to the other axial end of the sliding surface. Here, the one tapered surface may have an axial length greater than that of the other tapered surface. In addition, the one tapered surface may have a cone angle greater than that of the other tapered surface. According to the sliding bearing having such tapered surfaces, the bearing body can be easily fitted to the outer peripheral surface of the rack shaft from the one tapered surface side, with the result that it is possible to substantially reduce the number of assembly steps.

In the present invention, the bearing body is integrally formed of a synthetic resin. As the synthetic resin for forming the bearing body, it is possible to cite as a preferred example a thermoplastic synthetic resin such as polyacetal resin, polyamide resin, polyethylene resin, tetrafluoroethylene resin, or the like.

Advantages of the Invention

According to the present invention, it is possible to provide a sliding bearing which makes it possible to more reliably suppress the generation of unpleasant noise attributable to the stick-slip phenomenon or the like.

MODE FOR CARRYING OUT THE INVENTION

Figure 1:
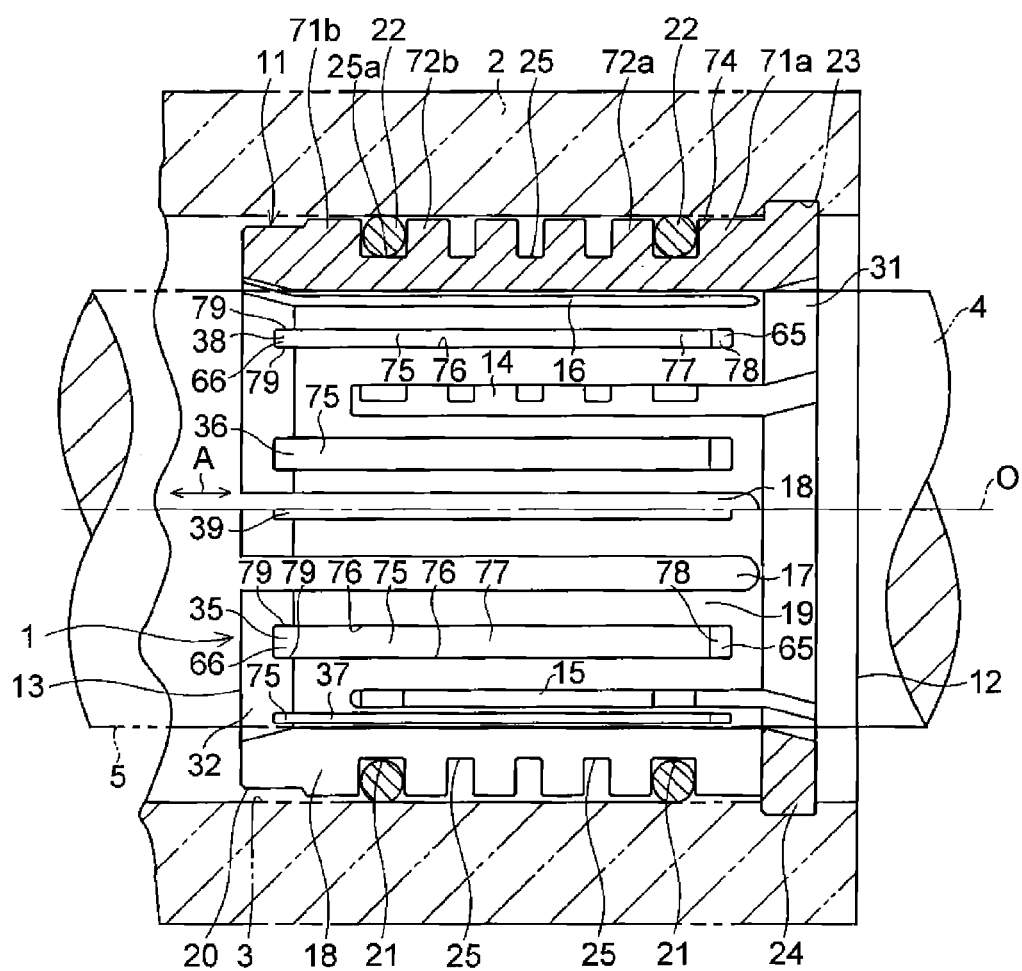
FIG. 1 is an explanatory cross-sectional view, taken in the direction of arrows along line I-I shown in FIG. 2, of a sliding bearing in accordance with a preferred embodiment of the invention.
Figure 2:
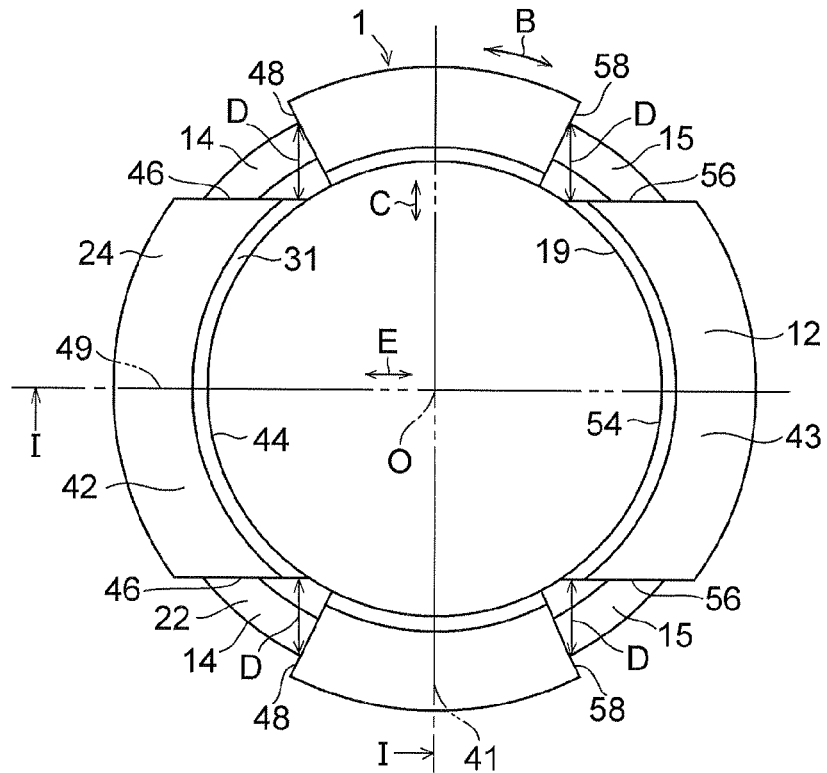
FIG. 2 is an explanatory right side view of the sliding bearing in the embodiment shown in FIG. 1.
Figure 3:
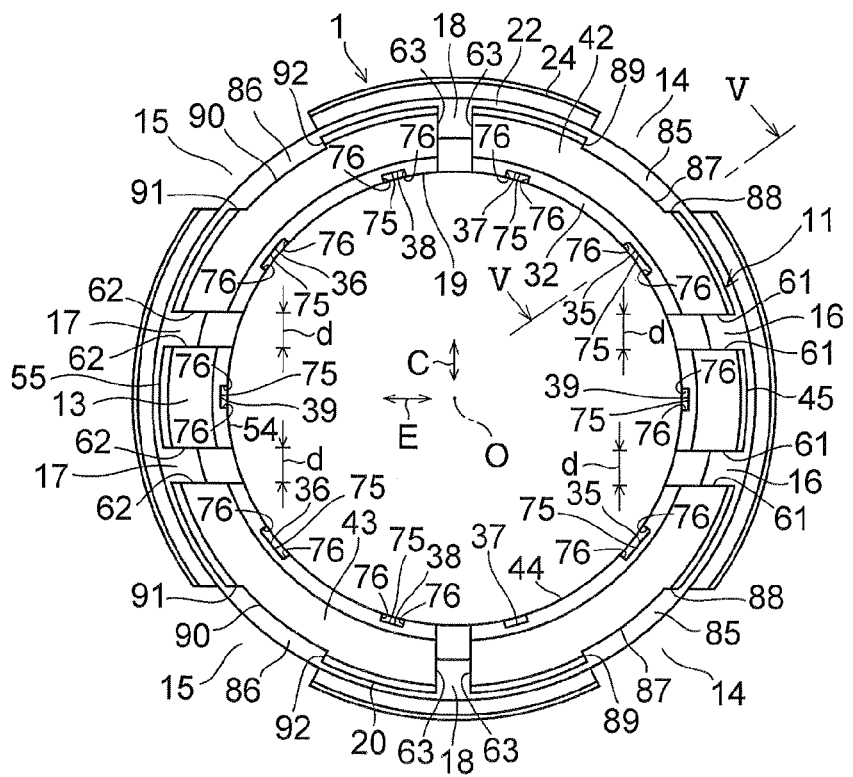
FIG. 3 is an explanatory left side view of the sliding bearing in the embodiment shown in FIG. 1.

Hereafter, a more description will be given of the present invention on the basis of a preferred embodiment. It should be noted that the present invention is not limited to the embodiment.

Embodiment

In FIGS. 1 to 6, a sliding bearing 1 in accordance with this embodiment is adapted to be interposed between a cylindrical inner peripheral surface 3 of a housing 2 and a cylindrical outer peripheral surface 5 of a rack shaft 4 which is inserted and secured in the housing 2.

The sliding bearing 1 includes a cylindrical bearing body 11; a total of two pairs of slits 14 and 15 provided in the bearing body 11 and extending from one end face 12 in an axial direction A of the bearing body 11 toward the other end face 13 in the axial direction A of the bearing body 11; a total of three pairs of slits 16, 17, and 18 provided in the bearing body 11 and extending from the other end face 13 of the bearing body 11 toward the one end face 12 of the bearing body 11; at least one straight groove provided on an inner side of the bearing body 11 in such a manner as to extend in the axial direction A and disposed in at least one of intervals between the slits 14 and 16, between the slits 15 and 17, between the slits 14 and 18, and between the slits 15 and 18, between the two slits 16, and between the two slits 17 in a direction B about the axis, i.e., in this embodiment, a total of two pairs of straight grooves 35 and 36 respectively disposed between the slits 14 and 16 and between the slits 15 and 17 in the direction B about the axis, as well as a total of three pairs of straight grooves 37, 38, and 39 respectively disposed between the slits 14 and 18, between the slits 15 and 18, between the two slits 16, and between the two slits 17 in the direction B about the axis; a cylindrical sliding surface 19 which is provided on the inner side of the bearing body 11 and partially severed in the direction B about the axis by the slits 14 to 18 and the straight grooves 35 to 39; at least one, i.e., in this embodiment, two fitting grooves 21 provided in an outer surface 20 of the bearing body 11; an elastic ring 22 which is fitted in each of the fitting grooves 21 in such a manner as to partially project radially outwardly from the outer surface 20 of the bearing body 11 and to reduce the diameter of the bearing body 11; and three annular grooves 25 disposed between the two fitting grooves 21 and provided in the outer surface 20 of the bearing body 11.

The bearing body 11, which integrally has a collar portion 24 which is severed in the direction B by the slits 14 and 15 and is fitted in an annular retaining groove 23 of the housing 2, has on its inner side, in addition to the sliding surface 19, a tapered surface 31 which extends in the axial direction A from the end face 12 toward the end face 13 while undergoing a gradual reduction in diameter, terminates at the one end of the sliding surface 19, and is severed in the direction B by the slits 14 and 15, a tapered surface 32 which extends in the axial direction A from the end face 13 toward the end face 12 while undergoing a gradual reduction in diameter, terminates at the other annular end of the sliding surface 19, and is severed in the direction B by the slits 16 to 18, and ventilating grooves 85 and 86 provided on the outer side of the bearing body 11 on the end face 13 side in such a manner as to communicate with the slits 14 and 15. One end of the sliding surface 19 is severed in the direction B by the slits 14 and 15, while the other end of the sliding surface 19 is severed in the direction B by the slits 16 to 18 and the straight grooves 35 to 39.

At least one of the plurality of first slits 14 and 15, i.e., in this embodiment each of the two slits 14, which is open at the end face 12 and extends beyond the fitting groove 21 on the end face 13 side in the axial direction A, is provided in one semicylindrical portion 42 of the bearing body 11 severed by an imaginary diametrical line 41 passing through a center O of the bearing body 11. The remaining first slits of the plurality of first slits 14 and 15, i.e., in this embodiment each of the two slits 15, is provided in another semicylindrical portion 43 of the bearing body 11 severed by the imaginary diametrical line 41 passing through the center O of the bearing body 11.

Each of the two slits 14 provided in the semicylindrical 42 is provided in a direction E perpendicular to the imaginary diametrical line 41 such that its width D in a direction C parallel to the imaginary diametrical line 41 becomes gradually larger from an inner side 44 toward an outer side 45 of the semicylindrical portion 42. Each of the slits 14 is defined by a flat wall 46 of the semicylindrical portion 42 which extends flatly in the direction E perpendicular to the imaginary diametrical line 41, i.e., in a direction from the inner side 44 toward the outer side 45 of the semicylindrical portion 42 and by a flat wall 48 of the semicylindrical portion 42 which extends flatly and gradually away from the flat wall 46 in a direction from the inner side 44 toward the outer side 45 of the semicylindrical portion 42.

The two slits 14 are arranged symmetrically with each other at an angle of approximately 45° with respect to a perpendicular imaginary diametrical line 49 which passes through the center O and is perpendicular to the imaginary diametrical line 41.

In the same way as each of the two slits 14, each of the two slits 15 provided in the semicylindrical 43 is provided in the direction E perpendicular to the imaginary diametrical line 41 such that its width D in the direction C parallel to the imaginary diametrical line 41 becomes gradually larger from an inner side 54 toward an outer side 55 of the semicylindrical portion 43. Each of the slits 15 is defined by a flat wall 56 of the semicylindrical portion 43 which extends flatly in the direction E perpendicular to the imaginary diametrical line 41, i.e., in a direction from the inner side 54 toward the outer side 55 of the semicylindrical portion 43 and by a flat wall 58 of the semicylindrical portion 43 which extends flatly gradually away from the flat wall 56 from the inner side 54 toward the outer side 55 of the semicylindrical portion 43.

In the same way as the two slits 14, the two slits 15 are arranged symmetrically with each other at an angle of approximately 45° with respect to the perpendicular imaginary diametrical line 49 which passes through the center O and is perpendicular to the imaginary diametrical line 41. Further, the two slits 15 are arranged symmetrically with the two slits 14 with respect to the imaginary diametrical line 41.

Each of the two slits 16 provided in the semicylindrical portion 42 extends such that its width d in the direction C parallel to the imaginary diametrical line 41 becomes identical in the direction E perpendicular to the imaginary diametrical line 41, i.e., in a direction from the inner side 44 toward the outer side 45 of the semicylindrical portion 42 of the bearing body 11. The slits 16 are each defined by a pair of flat walls 61 of the semicylindrical portion 42 which are flat in the direction E perpendicular to the imaginary diametrical line 41 and extend parallel to each other. The slits 16 are disposed between the two slits 14 in the direction B and are arranged symmetrically with each other at an angle of approximately 20° with respect to the perpendicular imaginary diametrical line 49.

Each of the two slits 17 provided in the semicylindrical portion 43 extends such that its width d in the direction C parallel to the imaginary diametrical line 41 becomes identical in the direction E perpendicular to the imaginary diametrical line 41, i.e., in a direction from the inner side 54 toward the outer side 55 of the semicylindrical portion 43 of the bearing body 11. The slits 17 are each defined by a pair of flat walls 62 of the semicylindrical portion 43 which are flat in the direction E perpendicular to the imaginary diametrical line 41 and extend parallel to each other. The slits 17 are disposed between the two slits 15 in the direction B and are arranged symmetrically with each other at an angle of approximately 20° with respect to the perpendicular imaginary diametrical line 49.

Each of the two slits 18 provided at a boundary portion between the semicylindrical portion 42 and the semicylindrical portion 43 extends such that its width d in the direction E perpendicular to the imaginary diametrical line 41 becomes identical in the direction C parallel to the imaginary diametrical line 41, i.e., in a direction from the inner side 44 or 54 toward the outer side 45 or 55 of the semicylindrical portion 42 or 43 of the bearing body 11 at a boundary portion between the semicylindrical portion 42 and the semicylindrical portion 43. The slits 18 are each defined by a pair of flat walls 63 of the semicylindrical portion 42 or 43 which are flat in the direction C parallel to the imaginary diametrical line 41 and extend parallel to each other. The slits 18 are respectively arranged on the imaginary diametrical line 41 and symmetrically with each other at an angle of approximately 90° with respect to the perpendicular imaginary diametrical line 49.

Each of the straight grooves 35 to 39 provided in the bearing body 11 in such a manner as to extend in the axial direction A is closed on a side of the end face 12 in the axial direction A of the bearing body 11, and is open on a side of the end face 13 in the axial direction A of the bearing body 11. One end 65 of each of the straight grooves 35 to 39 is located on the side of the end face 12 and is closed by the sliding surface 19 of the bearing body 11, and the other end 66 of each of the straight grooves 35 to 39 is located on a side closer to the end face 13 of the bearing body 11 than the sliding surface 19, i.e., in an intermediate portion in the axial direction A of the tapered surface 32. The lengths in the axial direction A of the straight grooves 35 to 39 are equal to each other in this embodiment.

One pair of straight grooves of the total of two pairs of straight grooves 35 and 36, i.e., the two straight grooves 35 in this embodiment, are each disposed between the slits 14 and 16 in the direction B, and are provided in one semicylindrical portion 42 of the bearing body 11 severed by the imaginary diametrical line 41 passing through the center O of the bearing body 11. As shown in, for example, FIGS. 5 and 6, one of the two straight grooves 35 provided in the semicylindrical portion 42 in such a manner as to extend in the axial direction A has a rectangular cross-sectional shape with its corner portions provided with chamfering such as round chamfering, and is defined by a bottom surface 75 located on a side closer to the outer surface 20 than the sliding surface 19 and a pair of side walls 76 which are connected to the sliding surface 19 and both edges in the direction B of the bottom surface 75. The bottom surface 75 consists of a flat surface 77 extending in the axial direction A and an inclined surface 78 which is connected to the flat surface 77 on the end face 12 side and is inclined at the one end 65 from the outer side 45 toward the inner side 44 of the semicylindrical portion 42 in a direction from the end face 13 toward the end face 12. The pair of side walls 76 are respectively constituted by flat surfaces extending in parallel to each other in the axial direction A, and respective connecting edge portions 79 of the pair of side walls 76 which are connected to the tapered surface 32 at the other end 66 are inclined in the same way as the tapered surface 32.

Since the other one of the two straight grooves 35 is formed in the same way as the one of the two straight grooves 35, the other one of the two straight grooves 35 will be denoted, as required, by the same reference numerals in the drawings, and a detailed description thereof will be omitted. The two straight grooves 35 are arranged symmetrically with each other at an equal angle with respect to the perpendicular imaginary diametrical line 49 which passes through the center O and is perpendicular to the imaginary diametrical line 41. The width in the direction B of the bottom surface 75 of the straight groove 36 is equal to the width in the direction B of the straight groove 35. The depth of the straight groove 36 is equal to the depth of the straight groove 35.

The other pair of straight grooves of the total of two pairs of straight grooves 35 and 36, i.e., the two straight grooves 36 in this embodiment, are each disposed between the slits 15 and 17 in the direction B, and are provided in the other semicylindrical portion 43 of the bearing body 11 severed by the imaginary diametrical line 41 passing through the center O of the bearing body 11. Since the two straight grooves 36 provided in the semicylindrical portion 43 in such a manner as to extend in the axial direction A are formed in the same way as the two straight grooves 35 provided in the semicylindrical portion 42, the two straight grooves 36 will be denoted, as required, by the same reference numerals in the drawings, and a detailed description thereof will be omitted. The two straight grooves 36 are arranged symmetrically with each other at an equal angle with respect to the perpendicular imaginary diametrical line 49 which passes through the center O and is perpendicular to the imaginary diametrical line 41. The aforementioned angle is equal to the aforesaid angle of each of the two straight grooves 35 with respect to the perpendicular imaginary diametrical line 49 which passes through the center O.

Each of the two straight grooves 37 is provided in the semicylindrical portion 42 by being arranged between the slits 14 and 18 in the direction B. Each of the two straight grooves 38 is provided in the semicylindrical portion 43 by being arranged between the slits 15 and 18 in the direction B. One of the two straight grooves 39 is provided in the semicylindrical portion 42 by being arranged between the two slits 16 in the direction B, while the other one of the two straight grooves 39 is provided in the semicylindrical portion 43 by being arranged between the two slits 17 in the direction B. Since the straight grooves 37 to 39 are formed substantially in the same way as the straight grooves 35 and 36, the straight grooves 37 to 39 will be denoted, as required, by the same reference numerals in the drawings, and a detailed description thereof will be omitted. The widths in the direction B of the respective bottom surfaces 75 of the straight grooves 37 to 39 are equal to each other, and are narrower than the widths in the direction B of the straight grooves 35 and 36. The depths of the straight grooves 37 to 39 are respectively equal to the depths of the straight grooves 35 and 36. The two straight grooves 37 are arranged symmetrically with each other at an equal angle with respect to the perpendicular imaginary diametrical line 49, the two straight grooves 38 are arranged symmetrically with each other at an equal angle with respect to the perpendicular imaginary diametrical line 49, and the two straight grooves 39 are located on the perpendicular imaginary diametrical line 49 and are arranged symmetrically with each other. In the semicylindrical portion 42, the two straight grooves 35 and one of the two straight grooves 39 are arranged between the two straight grooves 37, and one of the two straight grooves 39 is arranged between the two straight grooves 35. In the semicylindrical portion 43, the two straight grooves 36 and the other one of the two straight grooves 39 are arranged between the two straight grooves 38, and the other one of the two straight grooves 39 is arranged between the two straight grooves 36.

In this embodiment, the straight grooves 35 to 39 are each provided in the bearing body 11 between all the adjacent ones of the slits 14 to 18 which are adjacent to each other in the direction B. However, at least one straight groove may be provided in at least one of intervals, for example, between the slits 14 and 16, between the slits 15 and 17, between the slits 14 and 18, and between the slits 15 and 18, between the two slits 16, and between the two slits 17.

Figure 7:
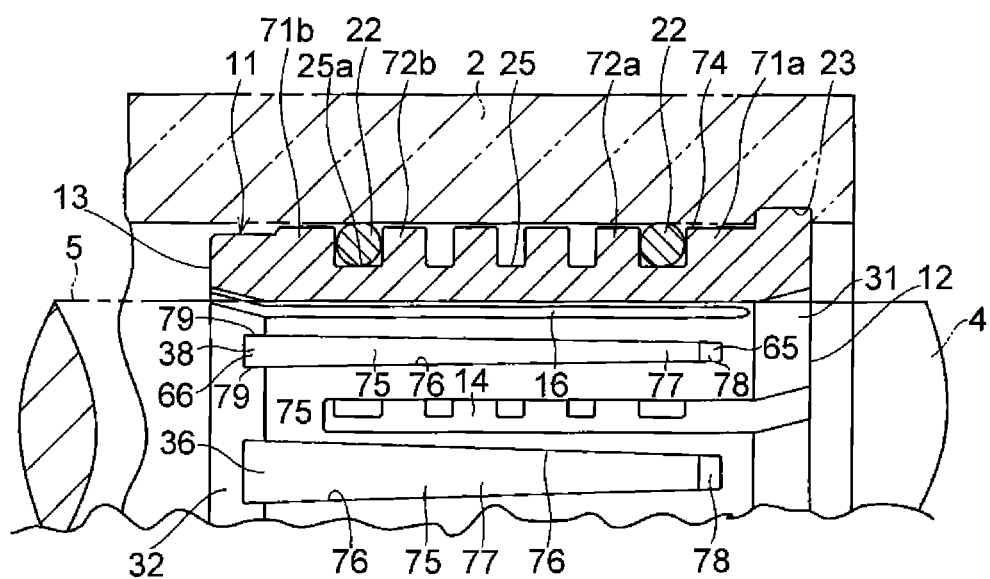
FIG. 7 is a partially enlarged explanatory cross-sectional view, taken in the direction of arrows along line I-I shown in FIG. 2, of the sliding bearing in accordance with another preferred embodiment of the invention.

The bottom surface 75 of at least one of the straight grooves 35 to 39 may be formed so as to be, for example, a concave surface or convex surface as viewed from the end face 13 side. The width in the direction B of the bottom surface 75 of at least one of the straight grooves 35 to 39 may be formed so as to become, for example, gradually narrower from the end face 13 toward the end face 12. The groove depth of at least one of the straight grooves 35 to 39 may be formed to be, for example, deep on the end face side 13 and shallow on the end face 12 side by being inclined with respect to a line extending in the axial direction A so as to be oriented from the outer surface 20 toward the sliding surface 19 side in the direction from the end face 13 toward the end face 12. Further, as shown in, for example, FIG. 7, the pair of side walls 76 of at least one of the straight grooves 35 to 39 may be formed so as to gradually approach each other from the end face 13 toward the end face 12.

A lubricant may be disposed in the straight grooves 35 to 39, in which case the lubricant is supplied onto the sliding surface 19 by such as the movement in the axial direction A of the rack shaft 4. The supply of the lubricant disposed in the straight grooves 35 to 39 to the sliding surface 19 can be suitably adjusted by appropriately changing the width, the chamfered shape in such as round chamfering, and the like of these straight grooves 35 to 39.

The ventilating grooves 85 are provided in the outer surface 20 of the bearing body 11 in such a manner as to extend from the end face 13 in the axial direction. A and to be connected to respective other ends in the axial direction A of the slits 14. Such ventilating grooves 85 are each defined by an inclined bottom surface 87, a flat wall 88 connected to the flat wall 46 and extending flatly in the direction E, and a flat wall 89 connected to the flat wall 48 and extending in the direction E.

The ventilating grooves 86 are provided in the outer surface 20 of the bearing body 11 in such a manner as to extend from the end face 13 in the axial direction A and to be connected to respective other ends in the axial direction A of the slits 15. Such ventilating grooves 86 are each defined by an inclined bottom surface 90, a flat wall 91 connected to the flat wall 56 and extending flatly in the direction E, and a flat wall 92 connected to the flat wall 58 and extending in the direction E.

The ventilating grooves 85 and 86 may be made gradually deeper from the end face 13 toward the end face 12.

The bearing body 11 including the collar portion 24 is integrally formed of a synthetic resin, e.g., a thermoplastic synthetic resin, such as polyacetal resin and polyamide resin.

One of the two fitting grooves 21 provided in the outer surface 20 of the bearing body 11 in such a manner as to be spaced apart from each other in the axial direction A is defined by two annular projections 71a and 72a on the outer surface 20 side of the bearing body 11. The other one of the two fitting grooves 21 provided in the outer surface 20 of the bearing body 11 in such a manner as to be spaced apart from each other in the axial direction A is defined by two annular projections 71b and 72b on the outer surface 20 side of the bearing body 11. The diameters of the outer surface 20 of the bearing body 11 at the projections 71a and 72a and the projections 71b and 72b are equal to each other, and yet are smaller than the diameter of the inner peripheral surface 3 of the housing 2, so that an annular gap (clearance) 74 is adapted to be produced between the outer surface 20 of the bearing body 11 at the projections 71a and 72a and the projections 71b and 72b and the inner peripheral surface 3 of the housing 2.

In a state in which each elastic ring 22 formed of an O-ring is not fitted to the inner peripheral surface 3 of the housing 2 but fitted in the fitting groove 21, the elastic ring 22 has an outside diameter greater than the diameter of the inner peripheral surface 3 of the housing 2. Further, in a state in which the elastic ring 22 is not fitted to the inner peripheral surface 3 of the housing 2 and not fitted in the fitting groove 21, the elastic ring 22 has an inside diameter smaller than the diameter of the bottom surface 25a of the fitting groove 21. As such, each elastic ring 22, which is fitted in the fitting groove 21 in such a manner as to partially project from the outer surface 20 of the bearing body 11 at the projections 71a and 72a and the projections 71b and 72b and to reduce the diameter of the bearing body 11, is adapted to partially project from the outer surface 20 by being tightened and deformed.

Each elastic ring 22 is fitted at its outer peripheral surface to the inner peripheral surface 3 of the housing 2 with an interference. The bearing body 11 is disposed on the inner peripheral surface 3 of the housing 2 with the clearance 74 between its outer surface 20 and the inner peripheral surface 3 of the housing 2. Further, the bearing body 11 is fitted on the outer peripheral surface 5 of the rack shaft 4 while tightening the rack shaft 4 movably in the axial direction A with the resiliency of the elastic rings 22 through the sliding surface 19.

Figure 4:
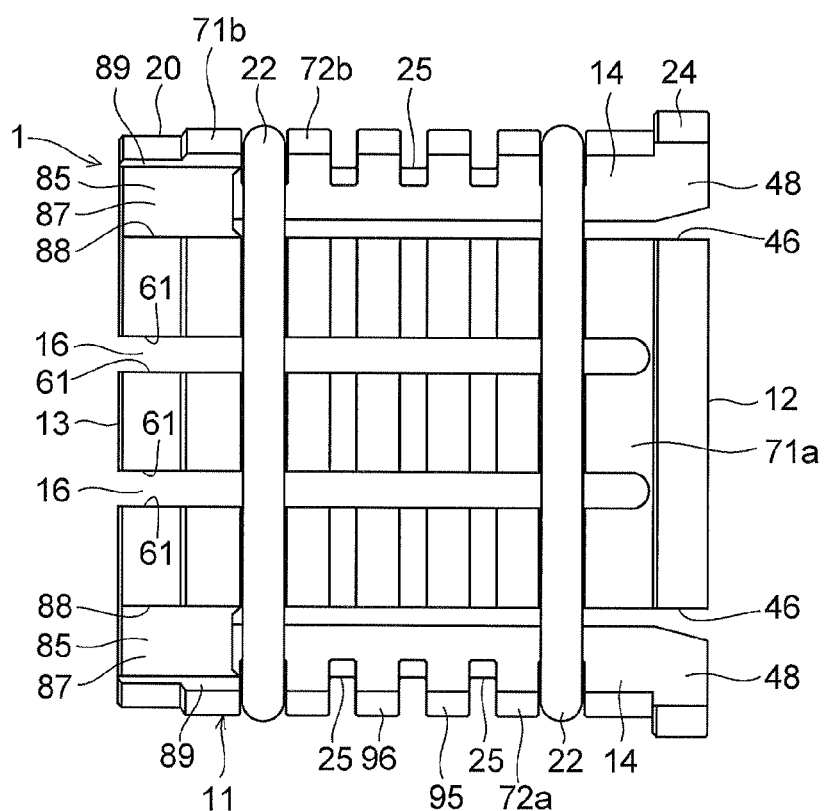
FIG. 4 is an explanatory plan view of the sliding bearing in the embodiment shown in FIG. 1.
Figure 5:
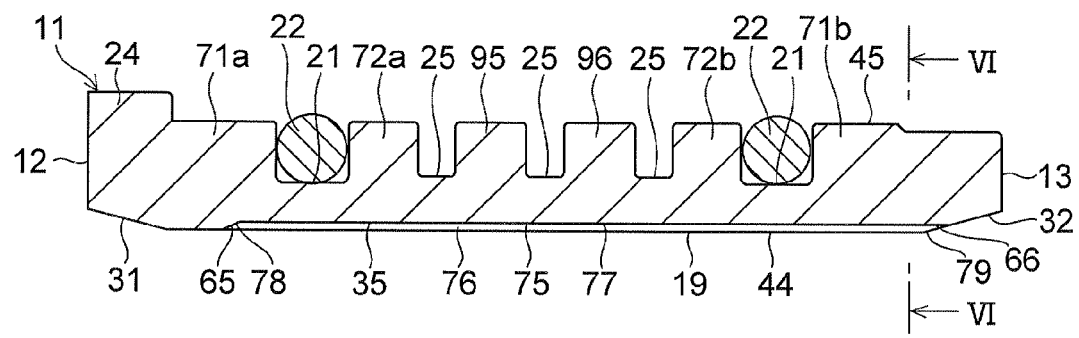
FIG. 5 is an enlarged cross-sectional view taken in the direction of arrows along line V-V shown in FIG. 3.
Figure 6:
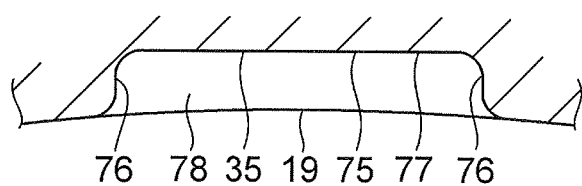
FIG. 6 is an enlarged cross-sectional view taken in the direction of arrows along line VI-VI shown in FIG. 5.

As shown in, for example, FIGS. 4 and 5, among the three annular grooves 25 provided in the outer surface 20 of the bearing body 11 in such a manner as to be spaced apart from each other in the axial direction A, one annular groove 25 located on the end face 12 side in the axial direction A is defined by the projection 72a and a projection 95 which is provided on the outer surface 20 side of the bearing body 11 adjacently at an interval to that projection 72a in the axial direction A. One annular groove 25 located on the end face 13 side in the axial direction A among the three annular grooves 25 is defined by the projection 72b and a projection 96 which is provided on the outer surface 20 side of the bearing body 11 adjacently at an interval to that projection 72b in the axial direction A. One annular groove 25 located intermediately in the axial direction A among the three annular grooves 25 is defined by the projection 95 and the projection 96. The diameters of the outer surface 20 of the bearing body 11 at the projections 95 and 96 are respectively equal to the diameters of the outer surface 20 of the bearing body 11 at the projections 71a and 72a and the projections 71b and 72b.

The rack shaft 4 which is movable in the axial direction A is connected at one end to the steering wheel and at the other end to the wheels via connecting mechanisms, respectively, and since such connecting mechanisms are known, a description thereof will be omitted.

With the above-described sliding bearing 1, as the elastic rings 22 are respectively fitted in the fitting grooves 21 on the outer surface 20 of the bearing body 11, the bearing body 11 having the slits 14 to 18 undergo reduction in diameter by the elastic compressive force of the elastic rings 22, and the sliding bearing 1 with its bearing body 11 reduced in diameter is disposed within the housing 2. Subsequently, as the rack shaft 4 is inserted into the inner side of the bearing body 11, the bearing body 11 undergoes enlargement in diameter by means of the slits 14 to 18 against the elastic compressive force of the elastic rings 22, while the rack shaft 4 is tightened at its outer peripheral surface 5 by the sliding surface 19 with the elastic compressive force of the elastic rings 22. Meanwhile, the elastic rings 22 are brought into contact with the inner peripheral surface 3 of the housing 2 with interferences at their outer peripheral surfaces. Further, the sliding bearing 1 is positioned with respect to the housing 2 by the collar portion 24 fitted to the annular retaining groove 23 of the housing 2.

Accordingly, the clearance between the sliding surface 19 and the outer peripheral surface 5 of the rack shaft 4 becomes zero, thereby making it possible to eliminate the collision between the bearing body 11 and the rack shaft 4. Consequently, collision noise which is otherwise transmitted to a driver as unpleasant sound does not occur. In addition, since the elastic rings 22 fitted in the fitting grooves 21 of the bearing body 11 have an interference with respect to the inner peripheral surface 3 of the housing 2, the elastic rings 22 undergo elastic deformation, and are capable of absorbing dimensional errors of the housing 2 in such as the roundness of its inside diameter by virtue of the elastic deformation.

The sliding bearing 1 has at least one straight groove provided on the inner side of the bearing body 11 in such a manner as to extend in the axial direction A and disposed between the slits in the direction B about the axis, i.e., in this embodiment, the straight grooves 35 to 39 respectively disposed between the slits 14 and 16, between the slits 15 and 17, between the slits 14 and 18, between the slits 15 and 18, between the two slits 16, and between the two slits 17. The straight grooves 35 to 39 are closed on the one end face 12 side in the axial direction A of the bearing body 11, and are open on the other end face 13 side in the axial direction A of the bearing body 11. Therefore, it is possible to further reliably prevent the generation of unpleasant noise attributable to the stick-slip phenomenon or the like based on the movement in the axial direction A of the rack shaft 4, and it is also possible to eliminate resonance between a very small amount of sliding noise and mechanical noise of the automobile.

With the sliding bearing 1, since the interior of the housing 2 and the exterior of the housing 2 can be made to communicate with each other by means of the slits 14 and 15 and the ventilating grooves 85 and 86, it is possible to secure the entry and exit of air outside the housing 2 with respect to the interior of the housing 2 in the movement of the rack shaft 4 in the axial direction A. Moreover, even if the outer surface side of the bearing body 11 together with the both slits 14 and 15 and the ventilating grooves 85 and 86 is molded by a two-split die body including an outer die for the semicylindrical portion 42 having projections for the ventilating grooves 85 and an outer die for the semicylindrical portion 43 having projections for the ventilating grooves 86, the both outer dies can be easily removed from the bearing body 11 by being respectively drawn out in mutually opposite directions in the direction E after molding.

In addition, with the sliding bearing 1, the two slits 14 extend in the direction E such that their width D becomes gradually larger from the inner side 44 toward the outer side 45 of the semicylindrical portion 42, and the two slits 15 extend in the direction E such that their width D becomes gradually larger from the inner side 54 toward the outer side 55 of the semicylindrical portion 43. Therefore, even if the outer surface 20 side of the bearing body 11 together with the both slits 14 and 15 is molded by the two-split die body including the outer die for the semicylindrical portion 42 and the outer die for the semicylindrical portion 43, the both outer dies can be easily removed from the bearing body 11 by being respectively drawn out in mutually opposite directions in the direction E after molding. With the sliding bearing 1, the inner surface side including the sliding surface 19 and the slits 16, 17 and 18 of the bearing body 11 are molded in conjunction with the molding of the outer surface 20 side of the bearing body 11 by placing within the die body a core for molding having projections corresponding to the slits 16, 17, and 18, and are molded by drawing out the core from within the bearing body 11 toward the end face 13 side after molding.

Accordingly, in order to manufacture the sliding bearing 1, it suffices to prepare a molding die including two outer dies, i.e., the outer die for the semicylindrical portion 42 and the outer die for the semicylindrical portion 43 for molding the outer surface 20 side of the bearing body 11, as well as the core for molding the inner surface side of the bearing body 11. Thus, it is possible to easily manufacture the sliding bearing 1 having the plurality of slits 14 and 15 and the fitting grooves 21, thereby making it possible to attain a cost reduction.

The slits 14 and 15 may be arranged such that the width is identical from the inner side 44 or 54 toward the outer side 45 or 55 of the semicylindrical portion 42 or 43 of the bearing body 11, or may be defined by a pair of flat walls of the semicylindrical portion 42 or 43 extending in parallel to each other in the direction E, or may still alternatively be defined by a pair of flat walls of the semicylindrical portion 42 or 43 extending flatly in such a manner as to be gradually away from each other from the inner side 44 or 54 toward the outer side 45 or 55.

Instead of the total of two pairs of straight grooves 35 and 36 and the total of three pairs of straight grooves 37, 38, and 39, the sliding bearing 1 may include, for example, a plurality of straight grooves (not shown) which are provided on the inner side of the bearing body 11 in such a manner as to extend in the axial direction A and which are respectively arranged between the slits 14 and 16, between the slits 15 and 17, between the slits 14 and 18, between the slits 15 and 18, between the slits 16, and between the slits 17 in the direction B about the axis. One of the plurality of straight grooves may be provided in the bearing body 11 by being closed on the end face 12 side and being open on the end face 13 side, and another straight groove adjacent to the aforementioned one straight groove may be closed on the end face 13 side and may be open on the end face 12 side in the direction B about the axis. With such a sliding bearing 1 as well, it is possible to obtain advantages similar to those described above.

DESCRIPTION OF REFERENCE NUMERALS

1: sliding bearing
11: bearing body
12, 13: end face
14, 15, 16, 17, 18: slit
19: sliding surface
20: outer surface
21: fitting groove
22: elastic ring
35, 36, 37, 38, 39: straight groove
25: annular groove

The invention claimed is:
1. A sliding bearing comprising: a cylindrical bearing body; a first slit provided in said bearing body and extending from one axial end face of said bearing body toward another axial end face of said bearing body; a second slit provided in said bearing body and extending from said other end face of said bearing body toward said one end face of said bearing body; at least one straight groove provided on an inner side of said bearing body in such a manner as to extend in an axial direction and disposed between said slits in a direction about an axis; a sliding surface which is provided on the inner side of said bearing body and partially severed in the direction about the axis by said slits and said straight groove; at least one fitting groove provided in an outer surface of said bearing body; and an elastic ring which is fitted in said fitting groove in such a manner as to partially project radially from said outer surface of said bearing body and to reduce the diameter of said bearing body, said at least one straight groove being closed on a side of said one axial end face of said bearing body, and being open on a side of said other axial end face of said bearing body, said straight groove being defined by a bottom surface located on a side closer to said outer surface of said bearing body than said sliding surface and extending in the axial direction and a pair of side walls connected to said sliding surface and both edges in the direction about the axis of said bottom surface and extending in the axial direction, said pair of side walls being formed in such a manner as to gradually approach each other from said other end face toward said one end face of said bearing body.

2. The sliding bearing according to claim 1, wherein said bearing body has a tapered surface which extends in the axial direction from said other end face toward said one end face of said bearing body while undergoing a gradual reduction in diameter, terminates at an annular end of said sliding surface, and is severed in the direction about the axis by said second slit, and one end of said straight groove which is located on the side of said one axial end face of said bearing body is closed by said sliding surface of said bearing body, while another end of said straight groove which is located on the side of said other axial end face of said bearing body is located on said tapered surface which is located on a side closer to said other end face of said bearing body than said sliding surface.

3. The sliding bearing according to claim 1, comprising at least two straight grooves, wherein a plurality of slits are provided as said first slit, at least one of said plurality of first slits being provided in one semicylindrical portion of said bearing body which is severed by an imaginary diametrical line passing through a center of said bearing body, a remaining one/ones of said plurality of first slits being provided in another semicylindrical portion of said bearing body which is severed by the imaginary diametrical line passing through the center of said bearing body, wherein said at least one first slit provided in said one semicylindrical portion extends in a direction perpendicular to the imaginary diametrical line, such that a width thereof in a direction parallel to the imaginary diametrical line becomes identical from an inner side to an outer side of said one semicylindrical portion of said bearing body, or such that said width becomes gradually larger from the inner side toward the outer side of said one semicylindrical portion of said bearing body, and said remaining one/ones of said first slits provided in said other semicylindrical portion extend in the direction perpendicular to the imaginary diametrical line, such that the width thereof in the direction parallel to the imaginary diametrical line becomes identical from the inner side to the outer side of said other semicylindrical portion of said bearing body, or such that said width becomes gradually larger from the inner side toward the outer side of said other semicylindrical portion of said bearing body, and wherein one of said at least two straight grooves is provided in said one semicylindrical portion by being located between at least one of said plurality of first slits and said second slit, and a remaining one of said at least two straight grooves is provided in said other semicylindrical portion by being located between a remaining one/ones of said plurality of first slits and said second slit.

* * * * *